United States Patent
Becker et al.

(10) Patent No.: US 7,865,516 B2
(45) Date of Patent: Jan. 4, 2011

(54) ASSOCIATIVE TEMPORAL SEARCH OF ELECTRONIC FILES

(75) Inventors: Craig H. Becker, Austin, TX (US); Leugim A. Bustelo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 11/867,040

(22) Filed: Oct. 4, 2007

(65) Prior Publication Data

US 2009/0094220 A1    Apr. 9, 2009

(51) Int. Cl.
G06F 17/30 (2006.01)
(52) U.S. Cl. .................................. 707/766
(58) Field of Classification Search ............ 707/769, 707/766
See application file for complete search history.

(56) References Cited

U.S. PATENT DOCUMENTS

| | | | | |
|---|---|---|---|---|
| 6,088,659 | A * | 7/2000 | Kelley et al. ............... 702/62 |
| 6,199,068 | B1 * | 3/2001 | Carpenter .................... 1/1 |
| 6,345,272 | B1 * | 2/2002 | Witkowski et al. .......... 707/759 |
| 6,725,227 | B1 | 4/2004 | Li |
| 6,772,150 | B1 * | 8/2004 | Whitman et al. ............ 707/721 |
| 6,961,751 | B1 | 11/2005 | Bates et al. |
| 7,062,475 | B1 | 6/2006 | Szabo et al. |
| 7,080,059 | B1 * | 7/2006 | Poston et al. ................... 1/1 |
| 7,162,473 | B2 * | 1/2007 | Dumais et al. ................. 1/1 |
| 7,200,627 | B2 * | 4/2007 | Stickler ........................ 1/1 |
| 7,526,425 | B2 * | 4/2009 | Marchisio et al. ........... 704/9 |
| 7,577,963 | B2 * | 8/2009 | O'Farrell et al. ............ 719/318 |
| 7,716,236 | B2 * | 5/2010 | Sidhu et al. ................ 707/766 |
| 2003/0088593 | A1 * | 5/2003 | Stickler ....................... 707/205 |
| 2003/0101216 | A1 | 5/2003 | Gupta |
| 2003/0182310 | A1 * | 9/2003 | Charnock et al. ........ 707/104.1 |
| 2004/0153445 | A1 * | 8/2004 | Horvitz et al. ................ 707/3 |
| 2004/0267700 | A1 * | 12/2004 | Dumais et al. ............... 707/2 |
| 2005/0267871 | A1 * | 12/2005 | Marchisio et al. ............ 707/3 |
| 2006/0026173 | A1 | 2/2006 | Amro et al. |
| 2006/0218122 | A1 * | 9/2006 | Poston et al. ................ 707/1 |

OTHER PUBLICATIONS

Brown et al., "Evaluation of a Non-Visual Molecule Browser", ASSETS'04, ACM, Oct. 18-20, 2004, pp. 40-47.
Rizzo et al., "Evaluating the Semantic Memory of Web Interactions in the xMem Project", AVI'06, ACM, May 23-26, 2006, pp. 185-192.
Paepcke et al., "Beyond Document Similarity: Understanding Value-Based Search and Browsing Technologies", SIGMOD Record, vol. 29, No. 1, Mar. 2000, pp. 80-92.

* cited by examiner

*Primary Examiner*—Neveen Abel Jalil
*Assistant Examiner*—Mark Andrew X Radtke
(74) *Attorney, Agent, or Firm*—Francis Lammes; Stephen J. Walder, Jr.; Libby Z. Toub (57) ABSTRACT

A method, system, and computer program product are provided for identifying data objects related to temporal characteristics. A first data object that has been previously stored is identified. The first data object has one or more associated temporal characteristics. At least one associated temporal characteristic is extracted from the first data object, thus, forming at least one extracted temporal characteristic. The at least one associated temporal characteristic is extracted in order to perform a search for at least one second data object. A search is performed for at least one second data object based on the at least one extracted temporal characteristic. The results of the search are presented in a graphical user interface.

11 Claims, 6 Drawing Sheets

ASSOCIATIVE TEMPORAL SEARCH OF ELECTRONIC FILES

BACKGROUND

1. Technical Field

The present application relates generally to an improved data processing system and method. More specifically, the present application is directed to an associative temporal search of electronic files.

2. Description of Related Art

In working with various electronic documents, presentations, graphics, and other files, numerous files are saved on a computer or shared network. Once a file is saved, a user may spend an unusual amount of time looking for the file in order to view or update the file. When one user may remember the exact file name and location where the file is stored, many users may spend minutes, if not hours, attempting to locate a file on the computer or shared network. In order to more accurately remember file locations, a user may store files in a specific location, such as a "My Documents" folder. While storing files in one location may increase the likelihood of finding a particular file, the user may still have difficulty identifying the particular file from other files stored in the same location. Thus, the user may turn to the use of a desktop search engine to find the intended file.

Known desktop search engines are client resident programs that search and index electronic mail, files, web browser history, and instant messages on a client computer's storage device. Examples of such desktop search engines include Google Desktop™, XI Desktop™, and Microsoft Windows Vista™. With these desktop search engines, a user may enter search terms into a field of the search engine and the search engine will search the electronic mail, files, web browser history, and instant messages to identify those entities that contain that search term. The search term may be found in the content of the entity or meta-tags of the entity. Results of the search may then be provided to the user. In this way, the user is able to obtain easy access to information on their personal computer by performing a text, search term based, search. However, if the user fails to accurately remember the name of the file or a term within the file, the use of a desktop search engine may still not be enough to find a particular file.

SUMMARY

The illustrative embodiments provide mechanisms for searching storage devices using an associative temporal search. If a user is not able to remember the particular name and location of a file they wish to retrieve from a storage device, the user may use an associative temporal search scheme in association with a search engine to identify files that were created, stored, bookmarked, modified, accessed, last used, or the like, on or about a date the user believes the files were created, stored, bookmarked, modified, or the like. The date provided by the user may be a specific date or a date associated with another event, such as when the user stored or modified another file, when the user bookmarked a certain website, when the user created or modified an email, or the like. The user is then presented with a list of the files that were created, stored, modified, bookmarked, last used, and/or accessed on or about the date entered by the user. The user may then be able to identify the particular file from the presented list of files.

The illustrative embodiments provide for identifying data objects related to temporal characteristics. The illustrative embodiments identify a first data object that has been previously stored. The first data object has one or more associated temporal characteristics. In order to perform a search for at least one second data object, the illustrative embodiments extract at least one associated temporal characteristic from the first data object thereby forming at least one extracted temporal characteristic. The illustrative embodiments search for the at least one second data object based on the at least one extracted temporal characteristic. The illustrative embodiments present, in a graphical user interface, the results of the search.

The illustrative embodiments may also comprise identifying a date range associated with the one or more associated temporal characteristics. The illustrative embodiments may then search for at least one third data object based on the at least one extracted temporal characteristic and the date range and present, in the graphical user interface, the results of the search.

The illustrative embodiments may also comprise detecting an adjustment of the date range through at least one control associated with the graphical user interface. The illustrative embodiments may then search for at least one fourth data object based on the at least one extracted temporal characteristic and the adjusted date range and present, in the graphical user interface, the results of the search. In the illustrative embodiments, the at least one control may be associated with at least one of a initial date, a date before the initial date, a date after the initial date, a start date, or an end date.

In the illustrative embodiments, the first data object may be at least one of a file, a bookmark, or an email and wherein the file, the bookmark, and the email has at least one of a created date, modified date, accessed date, stored date, last used date, or bookmark date. The illustrative embodiments may also comprise applying at least one filter to the identification of the at least one second data object. In the illustrative embodiments, the at least one filter may be at least one of a size filter, a location filter, a file type filter, a created filter, a modified filter, an accessed filter, a last used filter, a bookmarked filter, or a saved filter.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
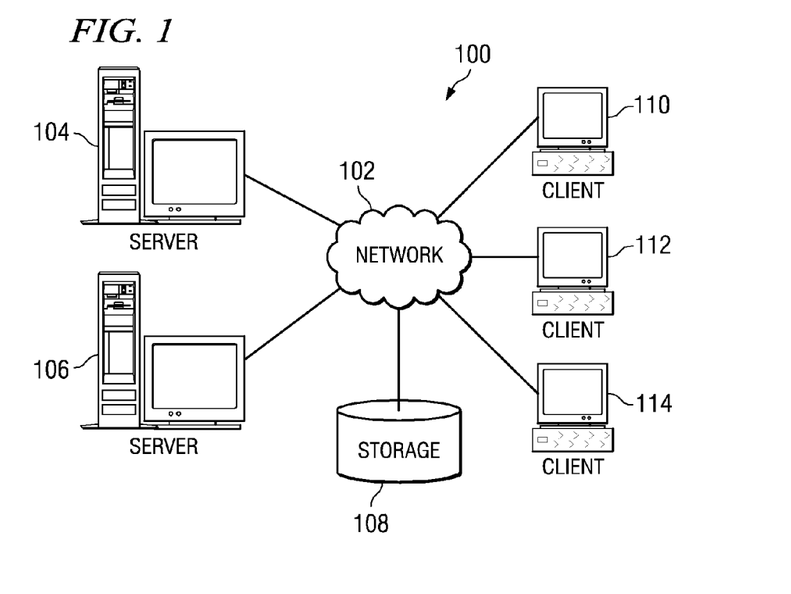
FIG. 1 is an exemplary representation of an exemplary distributed data processing system in which aspects of the illustrative embodiments may be implemented.
Figure 2:
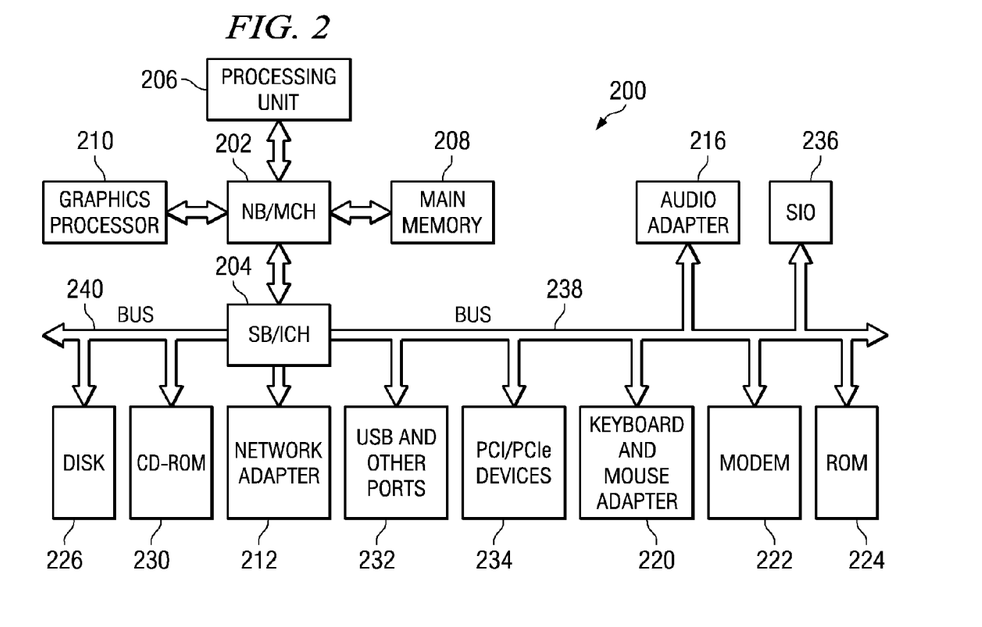
FIG. 2 is a block diagram of an exemplary data processing system in which aspects of the illustrative embodiments may be implemented.

The illustrative embodiments provide mechanisms for searching storage devices using an associative temporal search. As such, the mechanisms of the illustrative embodiments are especially well suited for implementation within a distributed data processing environment and within, or in association with, data processing devices, such as servers, client devices, and the like. In order to provide a context for the description of the mechanisms of the illustrative embodiments, FIGS. 1-2 are provided hereafter as examples of a distributed data processing system, or environment, and a data processing device, in which, or with which, the mechanisms of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide for searching storage devices using an associative temporal search scheme. If a user is not able to remember the particular name and location of a file they wish to retrieve from a storage device, the user accesses an associative temporal search scheme in association with a search engine that identifies files that were created, stored, bookmarked, modified, last used, accessed, or the like in relation with a date provided by the user. The last used date of a file indicates the last time the user accessed the file. The date provided by the user may be a specific date or a date associated with an item, such as when the user stored, modified, last used, and/or accessed another file or bookmark, when the user bookmarked a certain Website, when the user created or modified an email, or the like. The user may also provide before date and/or after date information in order to provide a wider selection of files from which the user can identify the desired file. Using the date, or the date associated with an item, the user is presented with a list of the files that were created, stored, bookmarked, modified, last used, accessed, or the like, on or about the date entered by the user. The user may then be able to identify the particular file from the presented list of files.

Figure 3:
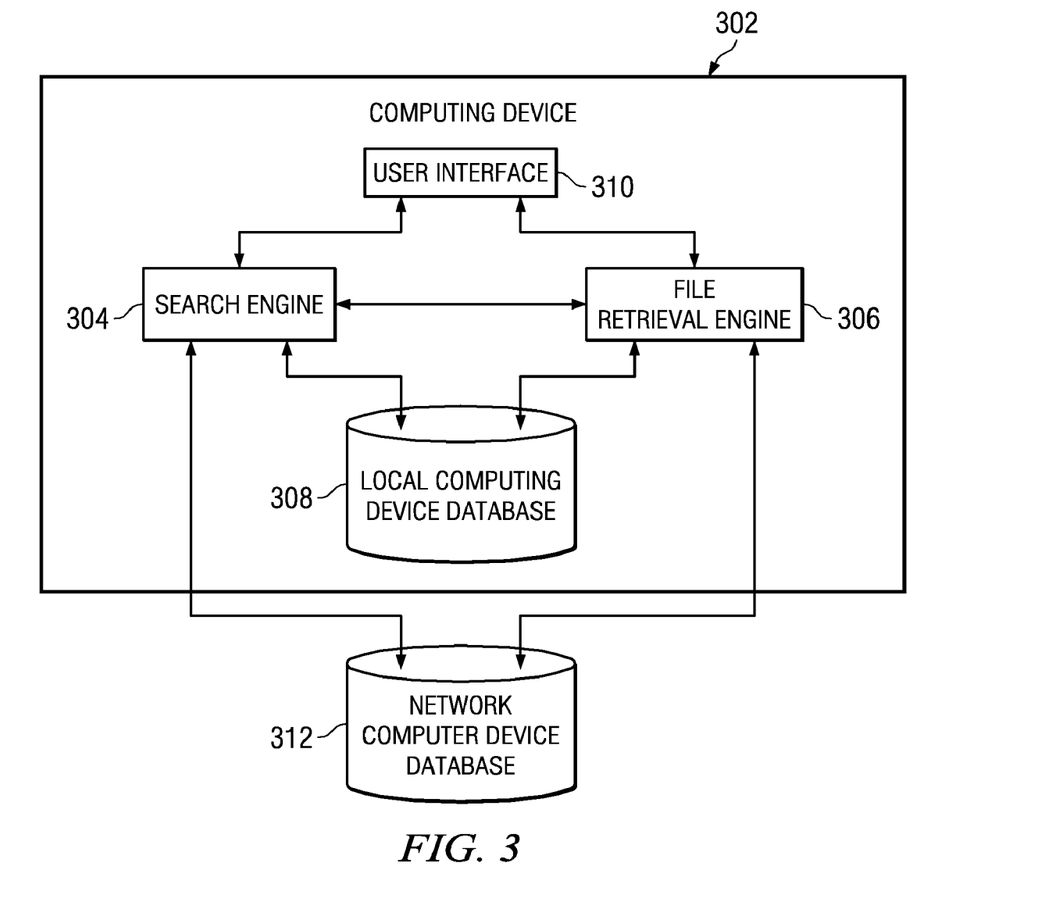
FIG. 3 is an exemplary diagram illustrating the primary operational elements of an illustrative embodiment.

FIG. 3 is an exemplary diagram illustrating the primary operational elements of an illustrative embodiment. As shown in FIG. 3, computing device 302 includes search engine 304 and file retrieval engine 306. The search engine 304 has interfaces to local computing device database 308, graphical user interface 310, and file retrieval engine 306 as well as an interface for communicating over one or more networks with network computing device database 312. While the illustrative embodiments depict local computing device database 308 and network computing device database 312, the illustrative embodiments may include other types of storage devices on which a user may store a file. File retrieval engine 306 has interfaces to local computing device database 308, graphical user interface 310, and search engine 304, as well as an interface for communication over one or more networks with network computing device database 312.

Search engine 304 obtains search criteria from a user using an initial input screen via graphical user interface 310 that identifies at least a date for which search engine 304 will search for files, which may also be referred to as data objects, on local computing device database 308 and/or the network computing device database 312 that were created, stored, bookmarked, modified, last used, accessed, or the like, on or around the provided date. The user may provide an actual date or identify an item, such as a bookmark, email, file, or the like. If the user identifies an item, which is also a data object, rather than an actual date, search engine 304 identifies temporal characteristics, such as a date and/or dates, associated with the identified item from which to execute a search. Search engine 304 may identify a date when the identified item was created, stored, bookmarked, modified, last used, accessed, or the like. If there is more than one date associated with the identified item, search engine 304 may present the dates associated with the identified item to the user, so that the user may select a specific date on which search engine 304 should perform the search. For example, if the identified item has a creation date and a modified date, the user may select to search for other files around the modified date rather than the creation date.

In addition, the user may provide criteria, such as a date range that includes an identified date and a number of days before the identified date, an identified date and a number of days after the identified date, a start date and end date, or the like. The user may also provide criteria that are used to filter the search to files that were created on the date or within the date range, files modified on the date or within the date range, files stored on the date or within the date range, Websites bookmarked around the date another Website was bookmarked, or the like. Further, the user may provide criteria that are used to filter the search to one or more types of file to search for, size or size range of file to search for, or the like. Types of files may be electronic mail messages, instant messages, electronic files, electronic documents, electronic images, or other compilations of data, which may be identified by file extension, such as .doc, .xls, .pdf, .jpg, or the like.

Once the criteria is input by the user using graphical user interface 310, search engine 304 communicates with local computing device database 308 and/or network computing device database 312, using known network communication protocols, to perform a search of local computing device database 308 and/or network computing device database 312. Local computing device database 308 and/or network computing device database 312 may store many different types of items of information including electronic mail messages, instant messages, electronic files, electronic documents, electronic images, or other compilations of data. Local computing device database 308 and/or network computing device database 312 may be an actual physical storage device, a plurality of physical storage devices, a portion of a physical storage device, a memory, or the like.

Search engine 304 applies the criteria provided by the user to the items of information maintained in local computing device database 308 and/or network computing device database 312 to thereby identify items of information in local computing device database 308 and/or network computing device database 312 that contain information correlating to the criteria. Search engine 304 then retrieves characteristic information regarding those items of information in local computing device database 308 and/or network computing device database 312 meeting one or more criteria set forth in the criteria from local computing device database 308 and/or network computing device database 312. The characteristic information may be stored on local computing device database 308 and presented to the user in a presentation screen on graphical user interface 310 for use by the user.

Graphical user interface 310 may present the characteristic information regarding those items of information in local computing device database 308 and/or network computing device database 312 meeting one or more criteria in any number of formats, such as a list, a tree structure, a thumbnail indicating the first page of each of the items of information, or the like. If the user fails to locate the desired file from the characteristic information presented in graphical user interface 310, then the user may adjust all or some portion of the search criteria and conduct another search using search engine 304. If the user locates the desired file or believes one or more of the files represented by the characteristic information to be the desired file, then the user may select one or more files from the characteristic information presented on graphical user interface 310.

Upon selecting one or more files from the characteristic information, computing device 302 may launch an application associated with the type of file and send a request to file retrieval engine 306 to retrieve the selected file(s) from local computing device database 308 and/or network computing device database 312. Upon file retrieval engine 306 retrieving the file from local computing device database 308 and/or network computing device database 312, computing device 302 presents the retrieved file to the user using the appropriate application via graphical user interface 310.

As mentioned previously, in some illustrative embodiments, if the user fails to locate the desired file from the characteristic information presented in graphical user interface 310, then the user may adjust all or some portion of the search criteria and conduct another search using search engine 304. The user may adjust the search criteria by closing the presentation screen and adjusting all or some portion of the data previously input in the initial input screen, which is exemplified in FIG. 4, or the user may also be provided with controls associated with the presentation screen that allows for adjustment of criteria as the user views the characteristic information, which is exemplified in FIG. 5.

Figure 4:
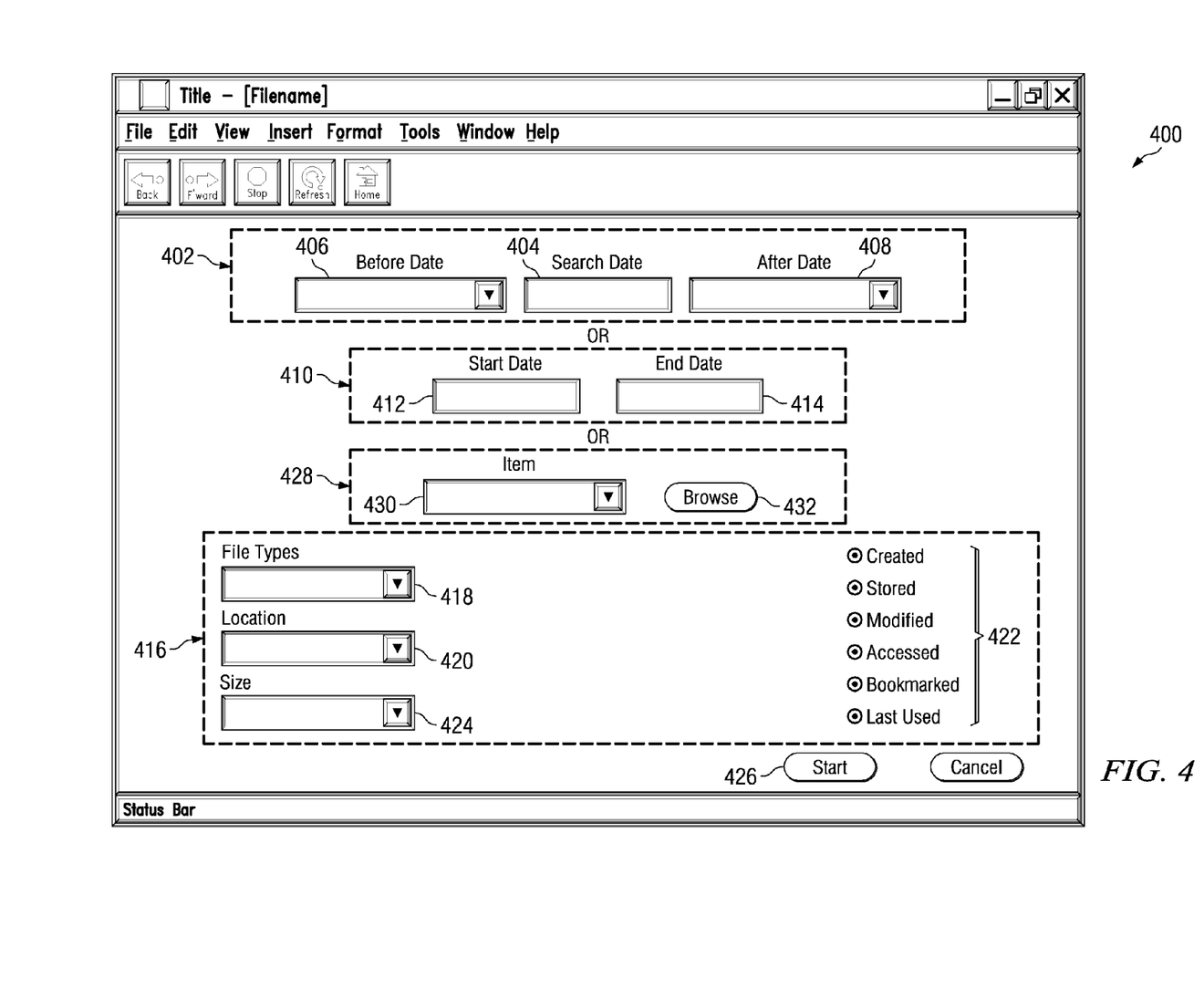
FIG. 4 is an exemplary diagram of a graphical user interface for initial input from a user in accordance with one illustrative embodiment.

FIG. 4 is an exemplary diagram of a graphical user interface for initial input from a user in accordance with one illustrative embodiment. As shown in FIG. 4, graphical user interface (GUI) 400, such as graphical user interface 310 of FIG. 3, includes one or more search options for a user. Search option 402 includes search date field 404 where a user would input the date for which to search for documents. Search option 402 may also include before date field 406 and after date field 408 where the user may either input an actual date before or after search date field 404 or the user may select a number of days before or after search date field 404. Using search option 402, the user may choose to use search date field 404 by itself, search date field 404 in conjunction with before date field 406, search date field 404 in conjunction with after date field 408, or search date field 404 in conjunction with before date field 406 and after date field 408.

Search option 410 includes start date field 412 and end date field 414. Using search option 410, the user may input a start date in start date field 412 and an end date in end date field 414. Search option 428 includes item field 430 where the user may identify an item, such as a bookmark, email, file, or the like. If the user identifies an item in item field 430, a search engine may identify a date and/or dates associated with the identified item from which to execute a search, such as a date when the identified item was created, stored, bookmarked, modified, or the like. In search option 428, the user may enter the item directly into item field 430 or browse for the item using browse button 432. Search options 402, 410, and 428 shown in FIG. 4 are only for illustrative purpose and are not intended to state or imply any limitation with regard to the various ways a user can provide criteria on which to search.

Once the user has selected one of the exemplary search options 402, 410, and 428, the user may also filter the search using filters 416, for example, file types field 418, location field 420, created/stored/modified/accessed/bookmarked/last used fields 422, and/or size field 424. Filters 416 shown in FIG. 4 are only for illustrative purpose and are not intended to state or imply any limitation with regard to the various ways a user can filter a search. Moreover, the particular arrangement and content of the filters 416 as wells as search options 402 and 410 as shown in FIG. 4 are not intended to be limiting with regard to the particular types of information that may be searched without departing from the spirit and scope of the present invention.

After having input the selected search criteria as well as any desired filters, the user may select the "start" GUI virtual button 426 to thereby submit a request to search a local computing device database and/or the network computing device database for items that correlate to the search criteria. The user's selections are converted into an electronic request that is sent to a search engine, such as search engine 304 of FIG. 3, for example, which processes the criteria to thereby identify items of information that correlate to the search criteria.

Thus, the illustrative embodiments provide a mechanism through which a graphical user interface may be provided to a user to identify search criteria for items of information the user would like to view. Moreover, the graphical user interface provides a mechanism through which the user may apply filters to the search criteria in order to filter the number of items of information returned by the search engine.

Figure 5:
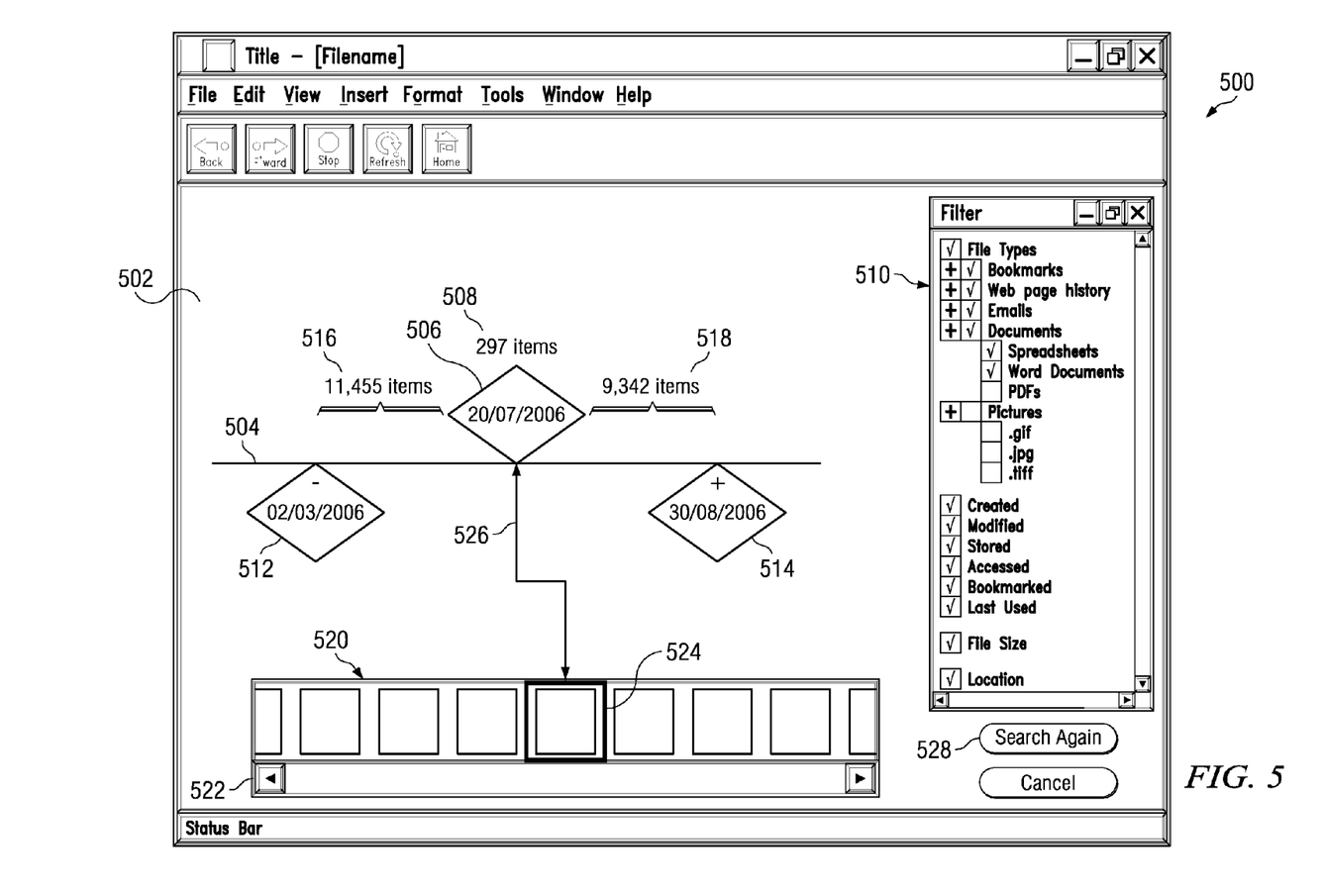
FIG. 5 is an exemplary diagram of a graphical user interface for presenting user information to a user in accordance with one illustrative embodiment.

FIG. 5 is an exemplary diagram of a graphical user interface for presenting user information to a user in accordance with one illustrative embodiment. As shown in FIG. 5, graphical user interface (GUI) 500, such as graphical user interface 310 of FIG. 3, includes an exemplary representation of characteristic information returned by a search engine. Display 502 includes timeline 504 that indicates search date 506 which may correlate to search date 404 of FIG. 4 as provided by the user or a date associated with an identified item, such as an item entered into item field 430 of FIG. 4. Associated with search date 506 is number of items of information 508 that are associated with search date 506. Number of items of information 508 may indicate the number of items of information that are filtered by the filters selected by the user. For reference to the user, display 502 may also provide filter display 510, which displays the filters available and/or selected by the user. Once again, the exemplary filters depicted in filter display 510 of FIG. 5 are only for illustrative purpose and are not intended to state or imply any limitation with regard to the various ways a user can filter a search. Timeline 504 may also indicate before date 512 and after date 514 is selected by the user in the initial search. If before date 512 and after date 514 are presented with timeline 504, timeline 504 may also indicate number of before items of information 516 and number of after items of information 518.

In conjunction with timeline 504, display 502 also includes file list 520. In this example, file list 520 is depicted as a thumbnail display of characteristic information associated with the items of information correlating to timeline 504. File list 520 shown in FIG. 5 is only for illustrative purpose and is not intended to state or imply any limitation with regard to the various ways files may be presented to the user. That is, characteristic information in file list 520 may be presented using a tree structure, icons, tiles, or the like. A user may move between the items of information in file list 520 using scroll bar 522. Once the user has identified one of the items of information in file list 520, the user may select the characteristic information from which selected item identifier 524 is displayed. Selected item identifier 524 may indicate the item selected by the user as well as indicating using pointer 526 the place within timeline 504 where the item resides.

As mentioned earlier, if the user fails to identify the desired item of information, the user may also be provided with controls associated with display 502 that allows for adjustment of criteria as the user views the characteristic information. Therefore, a user may adjust search date 506, before date 512, after date 514, and/or filter display 510. In adjusting search date 506, before date 512, or after date 514, the user selects the icon associated with search date 506, before date 512, or after date 514 and moves the icon along timeline 504. As the user adjusts one or more of search date 506, before date 512, or after date 514, an updated search may either be immediately conducted or after the user adjusts one or more of search date 506, before date 512, or after date 514, or after the user selects "search again" GUI virtual button 528 to thereby submit an updated search on the local computing device database and/or the network computing device database for items that correlate to the search criteria. Immediately conducting an update search based on adjusting one or more of search date 506, before date 512, or after date 514, may be set using user preferences. The user's selections are converted into an electronic request that is sent to a search engine, such as search engine 304 of FIG. 3, for example, which processes the criteria to thereby identify items of information that correlate to the new search criteria.

Likewise if the user adjusts any of the filters in filter display 510, then an updated search may either be immediately conducted after the user selects "search again" GUI virtual button 528 to thereby submit an updated search on the local computing device database and/or the network computing device database for items that correlate to the search criteria, based on user preferences. The contents of filter display 510 may change based on the search date or date range provided by the user. For example, if the user searches for items of information for a specific date or date range, then there may not have been any spreadsheet files that were accessed, bookmarked, last used, modified, created, and/or stored on that specific date or date range. Thus, filter display 510 may only display the file types that exist for the given date. If however, the user adjusts the given date or date range, and spreadsheet files were accessed, last used, bookmarked, modified, created, and/or stored on that new date or date range, then filter display 510 may indicate the new file types, so that the user has an opportunity to file on the file type. Filter display 510 may indicate specific file type filtering as available or unavailable by either displaying or not displaying the file types, indicating that file types are not available by "graying out" the file types, or some other method that indicated to the user that the file type does not appear in the given date or date range.

Once the user locates the desired item of information using the characteristic information displayed in file list 520, then the user may select one or more files from the characteristic information by, for example, double clicking on the characteristic information. Upon selecting one or more files from the characteristic information, the computing device may launch an application associated with the type of file and send a request to a file retrieval engine to retrieve the selected file(s) from the local computing device database and/or the network computing device database. Upon the file retrieval engine retrieving the file from the local computing device database and/or the network computing device database, the computing device presents the retrieved file to the user using the appropriate application via GUI 500.

Thus, the illustrative embodiments provide a mechanism through which a graphical user interface may be provided to a user to view characteristic information associated with a search for items of information. Moreover, the graphical user interface provides a mechanism through which the user may apply and/or adjust filters to the search criteria in order to filter the number of items of information returned by the search engine.

Figure 6A:
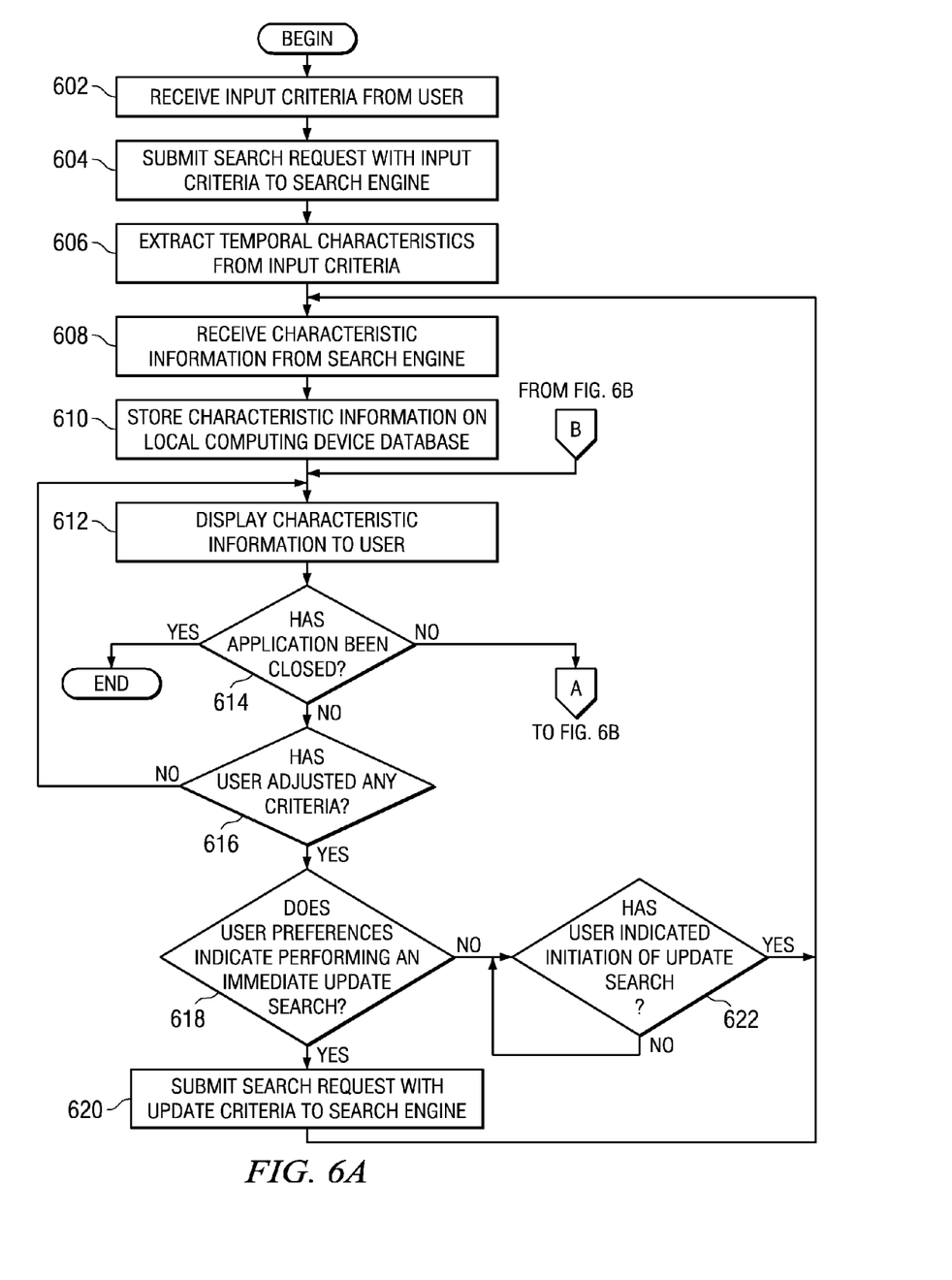
FIGS. 6A and 6B depict a flowchart outlining an exemplary operation of performing an associative temporal search in accordance with one illustrative embodiment.
Figure 6B:
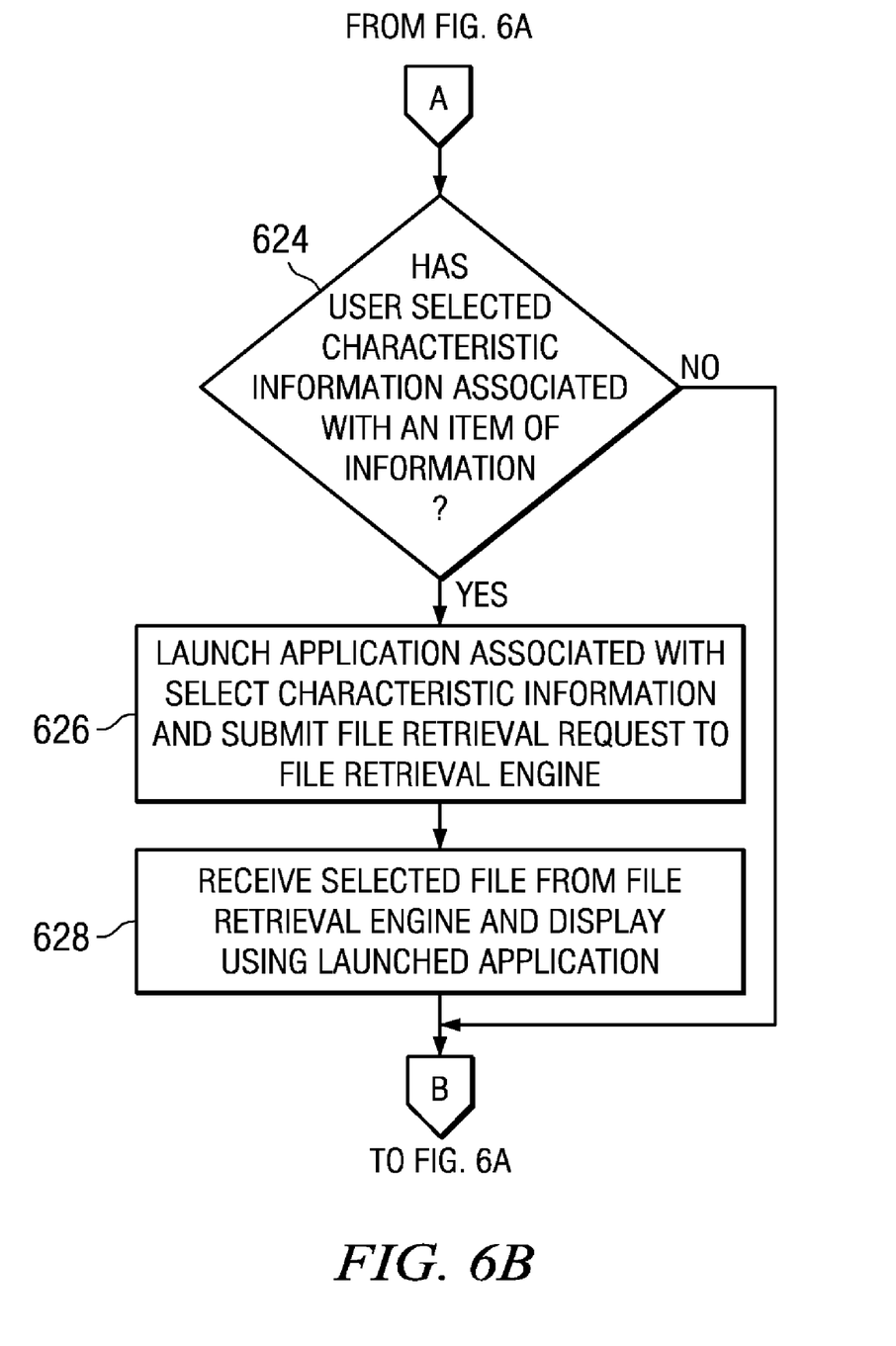

FIGS. 6A and 6B depict a flowchart outlining an exemplary operation of performing an associative temporal search in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

With regard to FIGS. 6A and 6B, as the operation begins, an associative temporal search computing device receives input criteria from a user via a graphical user interface (step 602). The input criteria, which have associated temporal characteristics, may be a stored data object, a date, a date range, or the like, as has been previously described. Upon submission of the criteria by the user, the computing device submits a search request with the input criteria to a search engine (step 604). The search engine extracts at least a portion of the temporal characteristics associated with the input criteria in order to perform a search for other data objects based on the extracted temporal characteristics (step 606). The search engine communicates with one or more computing device databases, using known network communication protocols, to perform a search of the computing device. The computing device receives characteristic information from the search engine (step 608). The characteristic information is information identifying the other data objects correlating to the search performed by the search engine using the user temporal characteristics. The computing device stores the characteristic information on a local computing device database (step 610) and presents the characteristic information of the other data objects using the graphical user interface (step 612).

At this point the user is able to view the received characteristic information in accordance with the manner described in FIG. 5. During viewing of the characteristic information, the computing device determines if the user has closed the computing device (step 614). If at step 614, the computing device detects the user closing the computing device, then the operation ends. If at step 614, the computing device fails to detect a closure of the computing device, then the computing device performs two operations. In the first operation the computing device determines if the user has adjusted any of the onscreen criteria using any of the controls associated with the presentation screen (step 616).

If at step 614 the computing device fails to detect an adjustment of one or more onscreen criteria, then the operation returns to step 612. If at step 616 the computing device detects an adjustment of one or more of the onscreen criteria, then the computing device determines if the user preferences indicates that an immediate update search be performed (step 618). If at step 618 the computing device determines that the user preferences indicates that an immediate update search be performed, then the computing device submits a search request with the updated input criteria to a search engine (step 620), with the operation continuing to step 608. If at step 618 the computing device determines that the user preference fails to indicate that an immediate update search be performed, then the computing device determines if the user has indicated the initiation of the update search (step 622). If at step 622 the computing device fails to detect an initiation of an update search, then the operation returns to step 622 to wait for the indication. If at step 622 the computing device detects an initiation of an update search, then the computing device submits a search request with the updated input criteria to a search engine (step 620), with the operation continuing to step 608.

In performing the second operation from step 614, the computing device determines if the user has selected any characteristic information for viewing (step 624). If at step 624 the computing device fails to detect a selection of characteristic information, then the operation returns to step 612. If at step 624 the computing device detects a selection of characteristic information, then the computing device launches an application associated with the type of file selected by the user and send a request to a file retrieval engine to retrieve the selected file(s) from the computing device database (step 626). Upon receiving the file from the file retrieval engine, the computing device presents the retrieved file to the user using the appropriate application via the graphical user interface (step 628), with the operation retuning to step 612.

Thus, the illustrative embodiments provide a mechanism for searching a computer or shared network storage device using an associative temporal search scheme. If a user is not able to remember the particular name and location of a file they wish to retrieve, the user accesses an associative temporal search scheme in association with a search engine that identifies files that were accessed, last used, bookmarked, created, stored, and/or modified in relation with a date provided by the user or an item identified by the user. The user may also provide before date and/or after date information in order to provide a wider selection of files from which the user can identify the desired file. Using the date identified by the user, and a before date and/or after date, the user is presented with a list of the files that were accessed, last used, bookmarked, created, stored, and/or modified on or about the date entered by the user. The user may then be able to identify the particular file from the presented list of files.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read-only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for identifying data objects related to temporal characteristics, comprising:

identifying, by a search engine, at least one first data object that has been previously stored, wherein the at least one first data object has one or more associated temporal characteristics and wherein the at least one first data object is identified based on input criteria from a user via a graphical user interface;

presenting, via the graphical user interface, the at least one first data object;

extracting, by the search engine, at least one associated temporal characteristic from the at least one first data object thereby forming at least one extracted temporal characteristic in order to perform a search for at least one second data object;

presenting, via the graphical user interface, the at least one extracted temporal characteristic;

receiving, by the search engine, a selection of a temporal characteristic from the at least one extracted temporal characteristic thereby forming a selected temporal characteristic;

presenting, via the graphical user interface, the selected temporal characteristic in association with a timeline that indicates a number of items that match the selected temporal characteristic;

receiving, by the search engine, a date range associated with the selected temporal characteristic, wherein the data range is detected by the search engine via an adjustment of the date range through at least one control associated with the graphical user interface and wherein the adjustment is made by the user either via a before date control that slides along the timeline adjusting a before date, an after date control that slides along the timeline adjusting an after date, or both the before date control that slides along the timeline adjusting the before date and the after date control that slides along the timeline adjusting the after date;

based on the adjustment of the date range, automatically searching, by the search engine, for the at least one second data object based on the selected temporal characteristic and the date range; and presenting, via the graphical user interface, the results of the search, wherein the at least one second data object is presented along with the extracted temporal characteristic in association with the timeline that indicates the number of items found associated with the selected temporal characteristic and either a number of items found before the selected temporal characteristic, a number of items found after the selected temporal characteristic, or both the number of items found before and after the selected temporal characteristic.

2. The method of claim 1, wherein the at least one first data object is at least one of a file, a bookmark, or an email and wherein the file, the bookmark, and the email has at least one of a created date, modified date, accessed date, stored date, last used date, or bookmark date.

3. The method of claim 1, further comprising:

applying, by the search engine, at least one filter to the identification of the at least one second data object.

4. The method of claim 3, wherein the at least one filter is at least one of a size filter, a location filter, a file type filter, a created filter, a modified filter, an accessed filter, a last used filter, a bookmarked filter, or a saved filter.

5. A computer program product comprising a non-transitory computer useable medium having a computer readable program, wherein the computer readable program, when executed in a data processing system, causes the data processing system to:

identify at least one first data object that has been previously stored, wherein the at least one first data object has one or more associated temporal characteristics and wherein the at least one first data object is identified based on input criteria from a user via a graphical user interface;

present, via the graphical user interface, the at least one first data object;

extract at least one associated temporal characteristic from the at least one first data object thereby forming at least one extracted temporal characteristic in order to perform a search for at least one second data object;

present, via the graphical user interface, the at least one extracted temporal characteristic;

receive a selection of a temporal characteristic from the at least one extracted temporal characteristic thereby forming a selected temporal characteristic;

present, via the graphical user interface, the selected temporal characteristic in association with a timeline that indicates a number of items that match the selected temporal characteristic;

receive a date range associated with the selected temporal characteristic, wherein the data range is detected by the search engine via an adjustment of the date range through at least one control associated with the graphical user interface and wherein the adjustment is made by the user either via a before date control that slides along the timeline adjusting a before date, an after date control that slides along the timeline adjusting an after date, or both the before date control that slides along the timeline adjusting the before date and the after date control that slides along the timeline adjusting the after date;

based on the adjustment of the date range, automatically search for the at least one second data object based on the selected temporal characteristic and the date range; and present, via the graphical user interface, the results of the search, wherein the at least one second data object is presented along with the extracted temporal characteristic in association with the timeline that indicates the number of items found associated with the selected temporal characteristic and either a number of items found before the selected temporal characteristic, a number of items found after the selected temporal characteristic, or both the number of items found before and after the selected temporal characteristic.

6. The computer program product of claim 5, wherein the at least one first data object is at least one of a file, a bookmark, or an email and wherein the file, the bookmark, and the email has at least one of a created date, modified date, accessed date, stored date, last used date, or bookmark date.

7. The computer program product of claim 5, wherein the computer readable program further causes the data processing system to:

apply at least one filter to the identification of the at least one second data object.

8. The computer program product of claim 7, wherein the at least one filter is at least one of a size filter, a location filter, a file type filter, a created filter, a modified filter, an accessed filter, a last used filter, a bookmarked filter, or a saved filter.

9. A system, comprising:
a processor; and
a memory coupled to the processor, wherein the memory comprises instructions which, when executed by the processor, cause the processor to:
identify at least one first data object that has been previously stored, wherein the at least one first data object has one or more associated temporal characteristics and wherein the at least one first data object is identified based on input criteria from a user via a graphical user interface;
present, via the graphical user interface, the at least one first data object;
extract at least one associated temporal characteristic from the at least one first data object thereby forming at least one extracted temporal characteristic in order to perform a search for at least one second data object;
present, via the graphical user interface, the at least one extracted temporal characteristic;
receive a selection of a temporal characteristic from the at least one extracted temporal characteristic thereby forming a selected temporal characteristic;
present, via the graphical user interface, the selected temporal characteristic in association with a timeline that indicates a number of items that match the selected temporal characteristic;
receive a date range associated with the selected temporal characteristic, wherein the data range is detected by the search engine via an adjustment of the date range through at least one control associated with the graphical user interface and wherein the adjustment is made by the user either via a before date control that slides along the timeline adjusting a before date, an after date control that slides along the timeline adjusting an after date, or both the before date control that slides along the timeline adjusting the before date and the after date control that slides along the timeline adjusting the after date;
based on the adjustment of the date range, automatically search for the at least one second data object based on the selected temporal characteristic and the date range; and
present, via the graphical user interface, the results of the search, wherein the at least one second data object is presented along with the extracted temporal characteristic in association with the timeline that indicates the number of items found associated with the selected temporal characteristic and either a number of items found before the selected temporal characteristic, a number of items found after the selected temporal characteristic, or both the number of items found before and after the selected temporal characteristic.

10. The system of claim 9, wherein the at least one first data object is at least one of a file, a bookmark, or an email and wherein the file, the bookmark, and the email has at least one of a created date, modified date, accessed date, stored date, last used date, or bookmark date.

11. The system of claim 9, wherein the instructions further cause the processor to:
apply at least one filter to the identification of the at least one second data object, wherein the at least one filter is at least one of a size filter, a location filter, a file type filter, a created filter, a modified filter, an accessed filter, a last used filter, a bookmarked filter, or a saved filter.

* * * * *